United States Patent [19]

Van Hoose

[11] 4,114,401
[45] Sep. 19, 1978

[54] UNIVERSAL JOINT EMBODYING OSCILLATING DRIVE PIN

[76] Inventor: William E. Van Hoose, 4117 Brompton Ave., Bell, Calif. 90201

[21] Appl. No.: 761,532

[22] Filed: Jan. 24, 1977

[51] Int. Cl.² ............................................. F16D 3/10
[52] U.S. Cl. ..................................... 64/7; 81/177 UJ
[58] Field of Search ................. 64/7, 8, 21; 81/177 UJ

[56] References Cited
U.S. PATENT DOCUMENTS

| | | | |
|---|---|---|---|
| 1,334,154 | 3/1920 | Harrison | 81/177 UJ X |
| 2,625,018 | 1/1953 | Dunn | 64/7 |
| 2,653,456 | 9/1953 | Heym | 64/7 |
| 2,859,597 | 11/1958 | Boigenzohn | 64/7 |
| 3,392,548 | 7/1968 | Meyer | 64/7 |
| 3,406,534 | 10/1968 | Chapper | 64/7 |
| 3,453,841 | 7/1969 | Federline | 64/7 |
| 3,691,788 | 9/1972 | Mazzlotti | 64/7 |
| 3,922,883 | 12/1975 | Bevacqua | 64/7 |

Primary Examiner—Milton S. Mehr
Attorney, Agent, or Firm—Huebner & Worrel

[57] ABSTRACT

A universal joint having a socket and a ball engaged in a bore of the socket, a pair of diametrically opposing slots in the socket wall, a socket driving pin extending through the ball and having its ends extending beyond the ball into said respective slots and being adapted to oscillate therein, and a device associated with the ball and socket to retain the ball in the socket. The pin and ball or the pin and slots are adapted for relative rotation.

7 Claims, 7 Drawing Figures

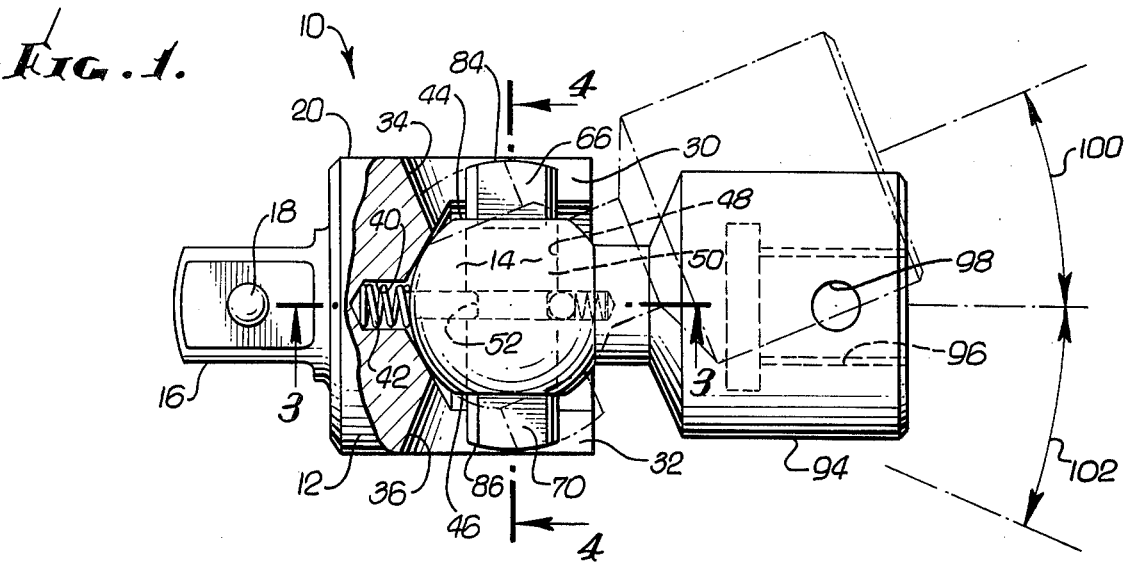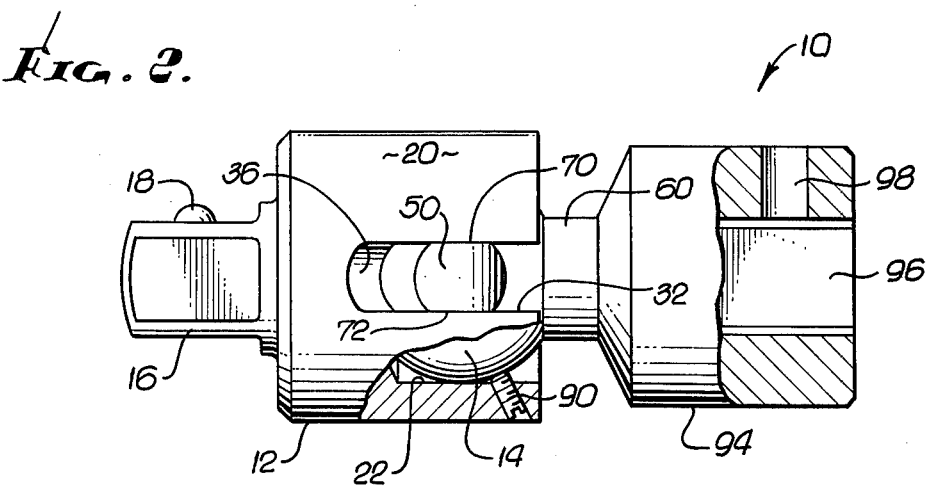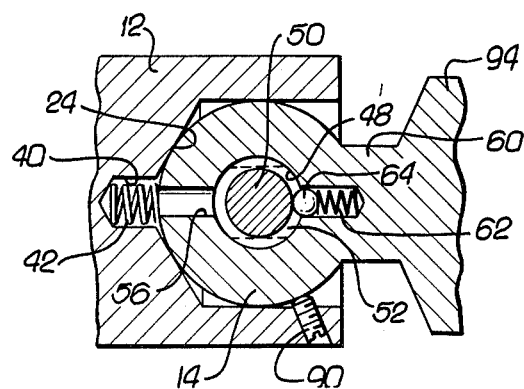

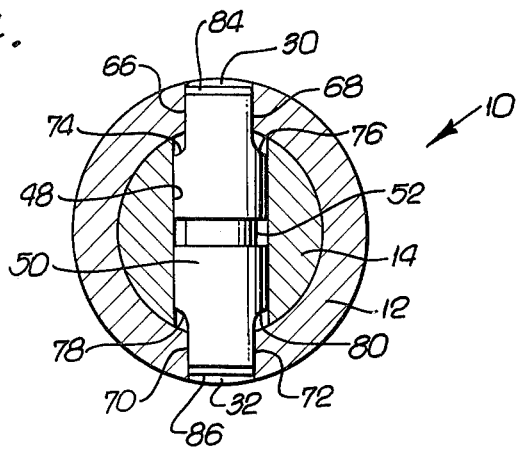
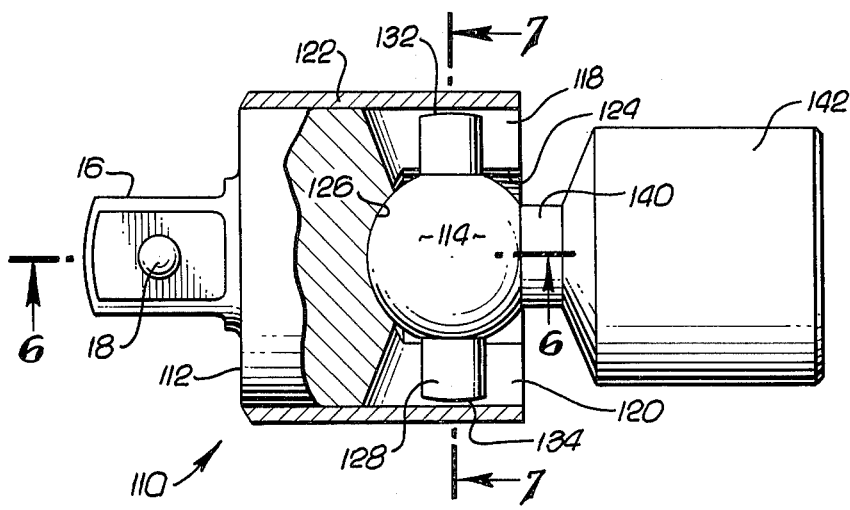
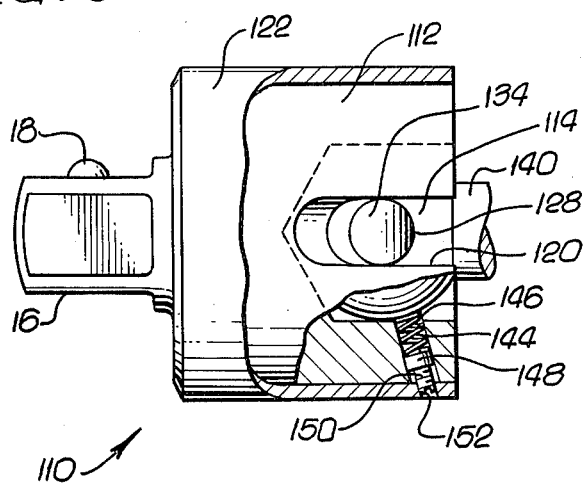
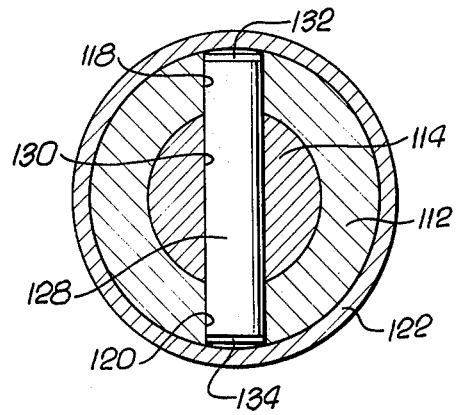

UNIVERSAL JOINT EMBODYING OSCILLATING DRIVE PIN

BACKGROUND OF THE INVENTION

The invention relates to universal joints usable for tools, such as wrenches, in which the two ends of the tool may be misaligned within limited angular positions with respect to each other.

In the prior art, universal joints typically used in tools have been expensive and difficult to manufacture, and also have been difficult to disassemble and reassemble to replace worn parts.

Another problem of great importance in the prior art has been that the balls have been made to be weak where the driving pin has been engaged therewith. The balls have been retained in the sockets by securing the pins in the socket walls and this has required enlarged, weakening openings in the balls to permit relative movement of the ball and socket. Further, additional means have been required to secure the pins in the sockets.

SUMMARY OF THE INVENTION

The present invention provides a universal joint in which the drive pin extending through the ball is not fixed in the socket but is free to oscillate with the ball in the socket during normal operation. Because there is no tendency to pull the ball and socket apart, they are held together in a simple manner which does not require securing the pin to the socket.

Accordingly, it is an object of the invention to provide an improved universal joint.

It is another object of the invention to provide a universal joint which is strengthened in the area where the ball extends through the pin. This is where most breakage occurs in prior art universal joints. By arranging the ball and pin in the socket so that the pin is not the means to secure the ball therein, the foregoing strengthening of the ball and pin area is accomplished.

It is still another object of the invention to provide a universal joint which is simple and inexpensive to manufacture, and is also simple to assemble and disassemble to permit easy and rapid replacement of worn parts.

It is a further object of the invention to provide a universal joint in which the torque acts on thicker and stronger ball-pin portions than in the prior art.

It is a still further object of the invention to provide a universal joint in which the drive pin and the ball oscillate in the socket, the pin sliding in slots therein. The pin can be made to rotate in the ball or in the slots.

It is another object of the invention to provide a universal joint in which the pin is maintained for rotation in the ball by simple and lightweight structures, and which are not required to be of great strength.

It is still another object of the invention to provide a universal joint in which the ball is snugly fitted within the socket to avoid any floppiness between the two parts. This is accomplished by relatively weak and lightweight parts.

It is a further object of the invention to provide a universal joint having a sleeve on the socket to retain the pin in the ball, and which sleeve permits the socket to be made having a thinner wall.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a side elevational view of a universal joint according to the invention;

FIG. 2 is a view of the universal joint, taken at 90° to the position of FIG. 1;

FIG. 3 is a fragmentary cross-sectional view, taken along the lines 3—3 in FIG. 1;

FIG. 4 is a cross-sectional view, taken along the lines 4—4 in FIG. 1;

FIG. 5 is a side elevational view of another embodiment of the invention;

FIG. 6 is a fragmentary view, partially in cross section, taken along the lines 6—6 in FIG. 5; and FIG. 7 is a cross-sectional view, taken along the lines 7—7 in FIG. 5.

DESCRIPTION OF THE PREFERRED EMBODIMENTS

Referring again to the drawings, there is shown in FIGS. 1–4 a universal joint, generally designated as 10, comprised of a socket 12 and a ball 14. The socket has a rectangular shank 16 at its outer end, the shank having a typical spring biased, depressible tool engaging detent 18.

The socket has an exterior cylindrical surface 20 and has in its inner end a cylindrical bore 22 having a substantially spherical bottom 24. In communication with the bore are diametrically opposed slots 30 and 32 in the wall of the socket. The slots have rearwardly tapering limiting surfaces 34 and 36, respectively. Extending inwardly from the bottom 24 of the bore 22 is a small diameter bore 40 containing a coil spring 42 in abutment with the inner end of the ball 14.

The ball is substantially spherical so as to fit for rotation within the bore 22 and has two flat faces 44 and 46 facing the respective slots 30 and 32. A bore 48 extends diametrically through the ball and fitted for rotation therein is a cylindrical drive pin 50 extending into the slots. A longitudinally centered, annular groove 52 is cut into the pin. Transverse to the annular groove is a diametrical bore 56 extending through the ball, interrupted by the bore 48, and in alignment with the groove 52. The bore 56 extends slightly beyond the ball into a shank 60 connected thereto.

A spring 62 abuts the bottom of the bore 56 and its other end abuts a ball 64 therein, and biases it into the annular groove 52 so as to retain the pin in the ball.

The pin 50 has pairs of parallel flat sides 66, 68 and 70, 72 adjacent its opposite ends in slidable engagement with the respective slots. The flat sides terminate inwardly at the cylindrical part of the pin in shoulders 74, 76 and 78, 80, which also serve to retain the pin within the ball when it is in the socket. The tips of the pin have convex surfaces 84 and 86 so that when they are oscillated they do not extend beyond the slots 30 and 32.

As shown in FIG. 2, a set screw 90 is threadedly engaged in the wall of the socket and protrudes inwardly to be in contact with the ball outwardly of its center to retain it in the socket. The set screw 90 and the spring 42 hold the ball snugly within the socket so as to provide a frictional fit to prevent the socket from flopping with respect to the ball. Such a fit is preferable in universal joints used with air impact tools.

Connected to the shank 60 is a cylindrical member 94 having an axially directed, rectangular central opening 96 in its outer end and a transverse bore 98 at right angles thereto. The bore 96 is adapted to receive a shank, as 16, having a detent 18 to be engaged in the bore 98.

In operation, the pin 50 and the ball 14 are adapted to oscillate in the socket into variations of positions as shown in the phantom outline in FIG. 1 when there is rotation in the direction of the slots, the flat sides of the pin sliding on the surfaces thereof. The oscillating travel of the cylindrical member 94 and ball is indicated by the arrows 100, 102 which extend through arcs of the order of 25° in each direction, limited by surfaces 34 and 36. Most relative movement of the ball and socket also includes rotation of the ball on the pin. During axial rotation of the joint, the ball through the drive pin 50 drives the socket 12.

The joint is assembled by inserting the spring 62 into the bore 56 with the ball 60 thereon and the pin is then moved into the bore 48 holding the ball against the spring. When the groove 52 is moved into alignment with the ball the spring snaps the ball into the groove so as to lock the pin in the ball.

With the spring 42 in the bore 40, the ball is moved into the socket, and the pin is moved into the slots. Thus, it is clear that the assembly and disassembly are very simple and provide for easy exchange of worn parts. In addition, the structure provides a large mass of ball around the pin so as to provide great strength in that area, which is where breakage typically occurs in the prior art universal joints.

In FIGS. 5–7 another embodiment of the invention is illustrated. Here, the universal joint, generally designated as 110, is formed of a socket 112 and a ball 114. The socket has a shank 16 in the same manner as the embodiment of FIG. 1. The cylindrical socket has diametrically opposed slots 118 and 120 and a central cylindrical bore 124 of the same general configuration as in the other embodiment. The cylindrical bore 124 terminates in a generally spherical bottom 126. Surrounding the socket is a sleeve 122 which may be securely fitted on the socket or integral therewith. Added strength of the sleeve permits the wall of the socket to be of a thinner structure than that shown in FIG. 1. A cylindrical drive pin 128 is tightly fitted within a diametrical bore 130 in the ball so as to be rotatable therewith, the ends of the pin being slidably and rotatably engaged in the slots 118, 120. The tips 132 and 134 of the pin are convex so as to permit oscillation of the pins within the socket without making contact with the sleeve.

Here, again, the ball has a large mass around the pin. Connected to the ball is a shank 140 on which there is a cylindrical tool receiving member 142 of the same type as 94 in FIG. 1.

In this embodiment the ball is snugly held within the socket by means of a spring 144 in an angular bore 146 through the wall of the socket, the inner end of the spring being in abutment with the ball outwardly of its center and the outer end of the spring being in abutment with a disc 148. The snugness of the ball within the socket is adjusted by means of a set screw 150 acting on the disc 148 and being accessible through a bore 152 extending through the sleeve. In operation, in this embodiment, most relative rotation of the ball and socket causes the drive pin to oscillate as well as to rotate in the slots, the ball respectively oscillating and rotating in the socket.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:

1. A heavy duty universal joint usable for tools in which the two ends of the tool may be misaligned, said universal joint comprising:

a socket having a ball receiving bore, a socket ball engaged in the socket bore, a pair of diametrically opposing slots in the socket wall outwardly of the bore.

a pin extending through a bore in the ball and having its ends therebyond extending into said respective slots and being adapted to oscillate therein, said ball forming a large substantially solid mass around the pin so as to provide great strength in the pin and ball engagement.

means on said pin adjacent and generally within the external surface of said ball to positively retain said pin within the socket in the axial direction of the pin, and means associated with said ball and socket to retain the ball in the socket.

said pin having two parallel flat sides adjacent each end, said slots having flat sides on which said flat sides on said pin slide as they oscillate.

said flat sides of said pin being fitted in said flat sides of said slots so as to not be rotatable therein.

2. The invention according to claim 1 in which:

said pin has a cylindrical portion within said ball axially inwardly of said flat sides, said means on said pin being shoulders formed at the inward ends of said flat sides at said cylindrical portion, said shoulders being adapted to abut the socket wall to positively retain the pin within the ball.

3. The invention according to claim 2 in which:

said ball is rotatable relative to the pin.

4. The invention according to claim 1 including:

a small diameter bore extension of said socket bore containing a coil spring abutting said ball to snugly engage the ball within the socket.

5. The invention according to claim 4 in which:

said means to retain the ball in the socket is a set screw extending angularly inwardly through the socket wall into the socket bore and against the ball outwardly of the ball center and adjacent the socket bore opening.

6. The invention according to claim 1 in which:

said means to retain the ball in the socket is comprised of a bore extending angularly inwardly through the socket wall into the socket bore outwardly of the center of the ball adjacent the socket bore opening;

a spring in said angular bore being in abutment with said ball outwardly of its center, and means in said angular bore to adjust said spring against said ball from the exterior of said socket so as to snugly engage the ball within the socket.

7. The invention according to claim 1 in which:
said pin is cylindrical within the ball,
a longitudinally centered, annular groove in the pin surface,
a second bore in the ball transverse to the pin in alignment with said groove.
a shank connected to the ball and extending outwardly of the socket bore,
said second bore extending slightly beyond the ball into the shank,
a spring in said second bore having one end abutting the bottom of the last bore in the shank,
the other end of the spring abutting a small second ball in said last bore, said spring biasing said second ball into said groove to center and retain the pin in the socket ball.

* * * * *